United States Patent
Chang et al.

(10) Patent No.: US 9,973,259 B2
(45) Date of Patent: *May 15, 2018

(54) METHOD FOR SENDING AND RECEIVING DATA ON A COOPERATIVE COMMUNICATIONS SYSTEM AND A COOPERATIVE COMMUNICATIONS METHOD

(71) Applicant: ELECTRONICS AND TELECOMMUNICATIONS RESEARCH INSTITUTE, Daejeon (KR)

(72) Inventors: Kap-Seok Chang, Daejeon (KR); Woo-Yong Lee, Daejeon (KR); Kyeongpyo Kim, Daejeon (KR); Hyoung-Jin Kwon, Cheongju-si (KR); Hyun-Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/620,154

(22) Filed: Jun. 12, 2017

(65) Prior Publication Data

US 2017/0279518 A1    Sep. 28, 2017

Related U.S. Application Data

(63) Continuation of application No. 15/213,359, filed on Jul. 18, 2016, now Pat. No. 9,680,558, which is a
(Continued)

(30) Foreign Application Priority Data

Jul. 8, 2009  (KR) .................. 10-2009-0062295
Feb. 16, 2010 (KR) .................. 10-2010-0013937

(51) Int. Cl.
  *H04B 3/36*    (2006.01)
  *H04B 7/155*   (2006.01)
  (Continued)

(52) U.S. Cl.
  CPC ......... *H04B 7/15592* (2013.01); *H04B 7/026* (2013.01); *H04B 7/0417* (2013.01);
  (Continued)

(58) Field of Classification Search
  CPC .. H04B 7/15592; H04B 7/026; H04B 7/0417; H04B 7/15521; H04B 7/086;
  (Continued)

(56) References Cited

U.S. PATENT DOCUMENTS 7,893,871 B1   2/2011 Lee et al.
8,301,956 B2  10/2012 Pi et al.
(Continued)

FOREIGN PATENT DOCUMENTS

CN   1898955 A   1/2007
CN   1973473 A   5/2007
(Continued)

OTHER PUBLICATIONS

Dae-Young Seol et al., "Relay-Assisted SFBC Single Carrier Transmission over Uplink Fast Fading Channels," Proc. IEEE Globecom, pp. 3883-3887, (Nov. 2007).
(Continued)

*Primary Examiner* — Dhaval Patel
(74) *Attorney, Agent, or Firm* — Rabin & Berdo, P.C.

(57) ABSTRACT

A data transmission method of a source node in a cooperative communication system includes: performing a beamforming to a relay node; transmitting data to the relay node; performing a beamforming to a destination node; and transmitting data to the destination node.

17 Claims, 9 Drawing Sheets

Related U.S. Application Data continuation of application No. 13/382,911, filed as application No. PCT/KR2010/004459 on Jul. 8, 2010, now Pat. No. 9,397,744.

(51) Int. Cl.

| | | |
|---|---|---|
| *H04B 7/026* | (2017.01) | |
| *H04B 7/06* | (2006.01) | |
| *H04L 1/00* | (2006.01) | |
| *H04L 1/06* | (2006.01) | |
| *H04B 7/0417* | (2017.01) | |
| *H04B 7/08* | (2006.01) | |

(52) U.S. Cl.
CPC .......... *H04B 7/0617* (2013.01); *H04B 7/086* (2013.01); *H04B 7/15521* (2013.01); *H04L 1/0077* (2013.01); *H04L 1/0618* (2013.01); *H04L 2001/0097* (2013.01)

(58) Field of Classification Search
CPC ... H04B 7/0617; H04L 1/0618; H04L 1/0077; H04L 2001/0097
USPC .............. 375/211, 260, 267, 347, 295, 316; 370/331, 329, 252, 293, 315, 330, 431, 370/465, 321
See application file for complete search history.

(56) References Cited

U.S. PATENT DOCUMENTS

| | | | |
|---|---|---|---|
| 8,321,739 B2 | 11/2012 | Huschke et al. | |
| 8,811,503 B2 | 8/2014 | Kim et al. | |
| 9,397,744 B2 * | 7/2016 | Chang | H04B 7/026 |
| 9,682,558 B2 * | 6/2017 | Tanaka | B41J 2/14233 |
| 2005/0286663 A1 | 12/2005 | Poon | |
| 2008/0165720 A1 | 7/2008 | Hu et al. | |
| 2009/0010215 A1 | 1/2009 | Kim et al. | |
| 2009/0017753 A1 | 1/2009 | Kim et al. | |
| 2009/0067539 A1 | 3/2009 | Maltsev et al. | |
| 2009/0129497 A1 | 5/2009 | Stopler et al. | |
| 2009/0147728 A1 | 6/2009 | Atia et al. | |
| 2009/0262678 A1 | 10/2009 | Oyman et al. | |
| 2009/0268657 A1 | 10/2009 | Alexiou et al. | |
| 2010/0142417 A1 | 6/2010 | Kim et al. | |
| 2010/0246599 A1 | 9/2010 | Wang et al. | |

FOREIGN PATENT DOCUMENTS

| | | |
|---|---|---|
| CN | 101361291 A | 2/2009 |
| CN | 101442389 A | 5/2009 |
| CN | 101573907 A | 11/2009 |
| KR | 2009-0117244 A | 11/2009 |

OTHER PUBLICATIONS

Hakam Mheidat et al., "Equalization Techniques for Distributed Space-Time Block Codes With Amplify-and-Forward Relaying," IEEE Transactions on Signal Processing, vol. 55, No. 5, pp. 1839-1852, (May 2007).

Wan-Jen Huang et al., "Relay-Assisted Decorrelating Multiuser Detector (RAD-MUD) for Cooperative CDMA Networks," IEEE Journal on Selected Areas in Communications, vol. 26, No. 3, pp. 550-560, (Apr. 2008).

\* cited by examiner

Base Layer (A')        Enhancement Layer (A")

METHOD FOR SENDING AND RECEIVING DATA ON A COOPERATIVE COMMUNICATIONS SYSTEM AND A COOPERATIVE COMMUNICATIONS METHOD

CROSS-REFERENCE TO THE RELATED APPLICATIONS

This is a continuation of U.S. application Ser. No. 15/213,359, filed on Jul. 18, 2016 and allowed on Feb. 15, 2017, which was a continuation of U.S. application Ser. No. 13/382,911, filed on Mar. 20, 2012 (now U.S. Pat. No. 9,397,744, issued on Jul. 19, 2016), which is, in turn, a national stage of PCT application number PCT/KR2010/04459, filed on Jul. 8, 2010. Furthermore, this application claims the foreign priority benefit of Korean application number 10-2010-0013937, filed on Feb. 16, 2010, and Korean application number 10-2009-0062295, filed on Jul. 8, 2009. The disclosures of these prior applications are incorporated herein by reference.

BACKGROUND OF THE INVENTION

Field of the Invention

Exemplary embodiments of the present invention relate to a method for transmitting and receiving data in a wireless communication system; and, more particularly, to a method for transmitting and receiving data in a cooperative communication system, and a cooperative communication method.

Description of Related Art

Recently, studies have been conducted on a cooperative communication method using a relay in order to improve diversity gain and throughput in a wireless communication system. In particular, many efforts have been made to utilize a cooperative communication method in IEEE 802.11 ad using 60 GHz. The cooperative communication method using the relay may reduce a path loss and enable a high-speed data communication because a source node and a relay node cooperatively transmit data to a destination node, and may expand a service area because a signal is also transmitted to a destination node located far away from a source node. In such a cooperative communication method, an inter-node communication is achieved through a wireless link of the source node—the relay node, the relay node—the destination node, and the source node—the destination node.

The cooperative communication method may be roughly classified into an Amplify & Forward scheme and a Decode & Forward scheme. The Amplify & Forward scheme is a scheme in which a relay node simply amplifies an RF signal transmitted from a source node and relays the amplified RF signal to a destination node. The Decode & Forward scheme is a scheme in which a signal received by a relay node is demodulated and decoded and then modulated and encoded and cooperatively transmitted to a destination node. Also, the cooperative communication method may be classified into a full duplex (FD) scheme and a half duplex (HD) scheme. The full duplex scheme is a scheme in which a relay node receives a signal from a source node and simultaneously relays the received signal to a destination node at the same time and the same frequency. The half duplex scheme is a scheme in which a relay node performs a signal transmission and reception at a different time or a different frequency.

SUMMARY OF THE INVENTION

An embodiment of the present invention is directed to a method for transmitting and receiving data in a cooperative communication system, and a cooperative communication method, which are capable of further improving diversity gain and throughput.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data transmission method of a source node in a cooperative communication system includes: performing a beamforming to a relay node; transmitting data to the relay node; performing a beamforming to a destination node; and transmitting data to the destination node.

In accordance with another embodiment of the present invention, a data transmission and reception method of a relay node in a cooperative communication system includes: receiving data, which is beamformed to the relay node, from a source node; performing a beamforming to a destination node; and transmitting the received data to the destination node.

In accordance with another embodiment of the present invention, a data reception method of a destination node in a cooperative communication system includes: receiving data, which is beamformed to the destination node, from a source node; and receiving the data which is beamformed to the destination node, from a relay node, wherein the relay node receives data, which is beamformed to the relay node, from the source node and transmits the received data to the destination node.

In accordance with another embodiment of the present invention, a cooperative communication method includes: generating an information signal according to one or more of a Distributed Space Time Coding (D-STC) scheme, a Layered Modulation and Coding (LMC) scheme, and a precoding vector switching scheme; and transmitting the information signal by performing a beamforming to a relay node and a destination node.

DESCRIPTION OF SPECIFIC EMBODIMENTS

Figure 1:
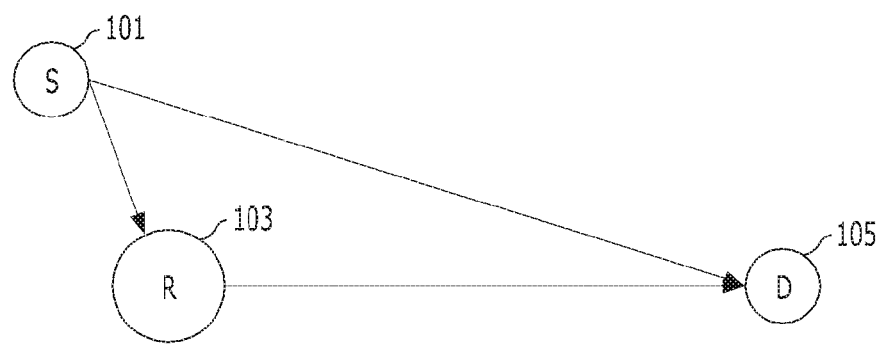
FIG. 1 is a view explaining a general cooperative communication method using a Distributed Space Time Coding (D-STC) scheme.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention FIG. 1 is a view explaining a general cooperative communication method using a Distributed Space Time Coding (D-STC) scheme. FIG. 1 illustrates a case where all nodes use the same frequency resource and operate in an HD mode in which simultaneous transmission and reception are impossible.

As illustrated in FIG. 1, a source node 101, which is a single source, modulates data signals at a first time slot T1 for data transmission, and transmits the modulated signals A1 and A2 to a relay node 103. The relay node 103 channel-decodes the modulated signals A1 and A2 transmitted from the source node 101, and estimates (i.e., acquires) information corresponding to the modulated signals A1 and A2.

The source node 101 transmits the modulated signals A1 and A2 to the destination node 105 at a second time slot T2. The relay node 103 transmits the decoded signals −(A2)* and (A1)*, which are estimated from the signals A1 and A2, to the destination node 105 at the second time slot T2. * denotes a conjugation.

The destination node 105 generates the signals A1 and A2 by decoding the signals received from the source node 101 and the relay node 103 at the second time slot T2 by using a D-STC scheme.

Figure 2:
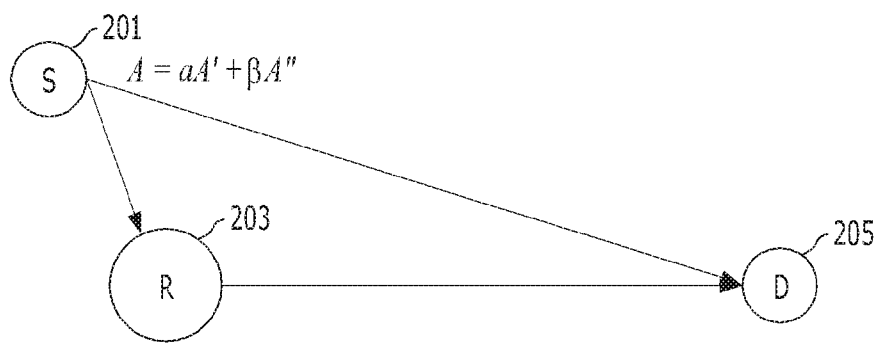
FIGS. 2 and 3 are views explaining a general cooperative communication method using a Layered Modulation and Coding (LMC) scheme.
Figure 3:
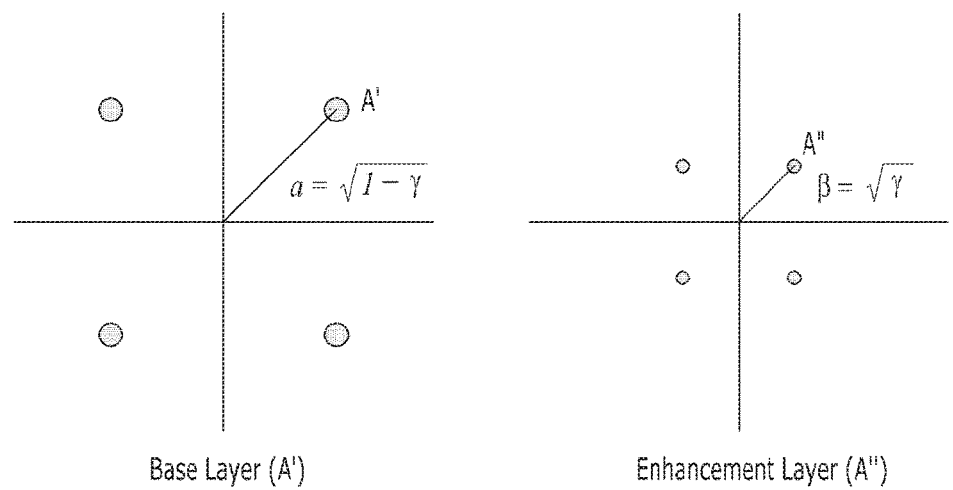

FIGS. 2 and 3 are views explaining a general cooperative communication method using a Layered Modulation and Coding (LMC) scheme. FIGS. 2 and 3 illustrate a case in which all nodes use the same frequency resource and operate in an HD mode in which simultaneous transmission and reception are impossible.

As illustrated in FIG. 2, a source node 201 performs an LMC on data, and transmits the LMCed signal A=αA'+βA" to a relay node 203 and a destination node 205 at a first time slot T1. The relay node 203 performs a layered demapping (Quadrature Phase Shift Keying (QPSK) demapping for each of A' and A") and a channel decoding on the signal received from the source node 201, estimates information A' and then estimates information A". The destination node 205 estimates the information A' through a QPSK demapping and a channel decoding on the signal received from the source node 201.

At a second time slot T2, the source node 201 does not transmit data, and the relay node 203 transmits the information A" among the estimated information to the destination node 205. Since the destination node 205 estimates the information A" through the QPSK demapping and the channel decoding, it may use the signal A=αA'+βA" transmitted from the source node 201.

FIG. 3 is a view explaining the LMC. A single symbol A transmitted from the source node 201 is modulated into A' and A" in a base layer and an enhancement layer, respectively. The information A' is information representing one quadrant in the base layer, and the information A" represents a phase in the quadrant indicated by the information A'. α and β are power coefficients of A' and A", respectively, where $\alpha^2+\beta^2=1$.

Meanwhile, in the cooperative communication methods described above with reference to FIGS. 1 and 2, one or more source nodes may transmit data and may simultaneously transmit data in the FD scheme by using different frequency resources.

Figure 4:
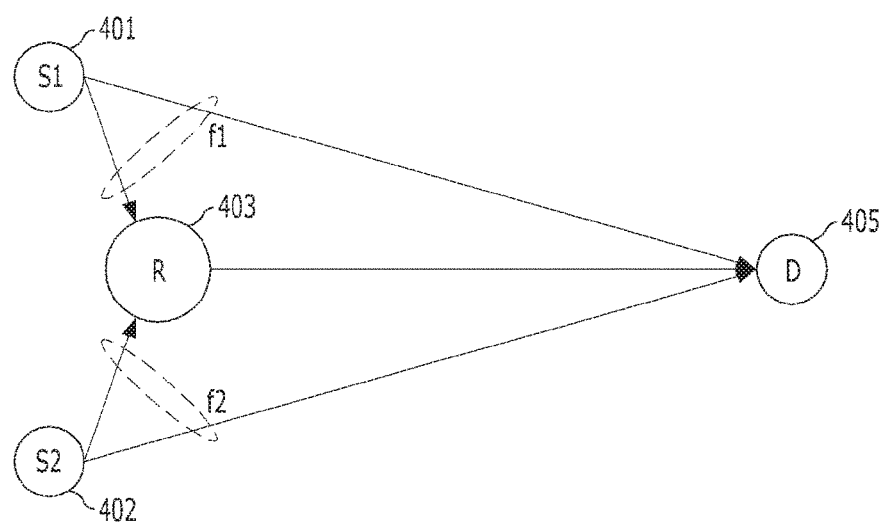
FIG. 4 is a view explaining a general cooperative communication method using a Network Coding (NC) scheme.

FIG. 4 is a view explaining a general cooperative communication method using a Network Coding (NC) scheme. The cooperative communication method using the NC scheme is used when a plurality of source nodes transmit data. Also, the cooperative communication method using the NC scheme is an example in which a wired NC technology is applied to a wireless communication.

A first source node 401 and a second source node 402 transmit information signals A and B including data to a relay node 403 and a destination node 405 by using a first frequency resource f1 and a second frequency resource f2 at a first time slot T1, respectively. The relay node 403 and the destination node 405 estimate binary information "a" and "b" corresponding to A and B through a channel decoding at the first frequency resource f1 and the second frequency resource f2. The relay node 403 performs an XOR operation on the binary information "a" and "b", and transmits the operation information C(=a⊕b) to the destination node 405 at a second time slot T2.

The destination node 405 estimates the data A and B by using the binary information, which is generated from the data received at the first time slot T1, and the operation information C, which is transmitted from the relay node 403.

Figure 5:
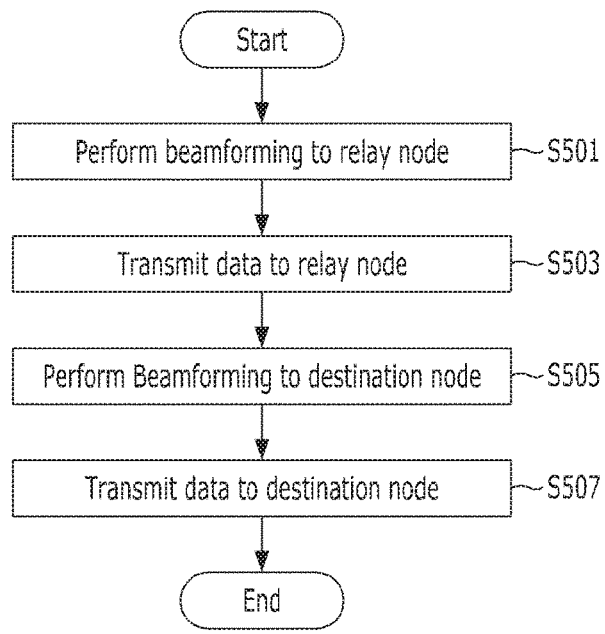
FIG. 5 is a view explaining a data transmission method of a source node in a cooperative communication system in accordance with an embodiment of the present invention.
Figure 6:
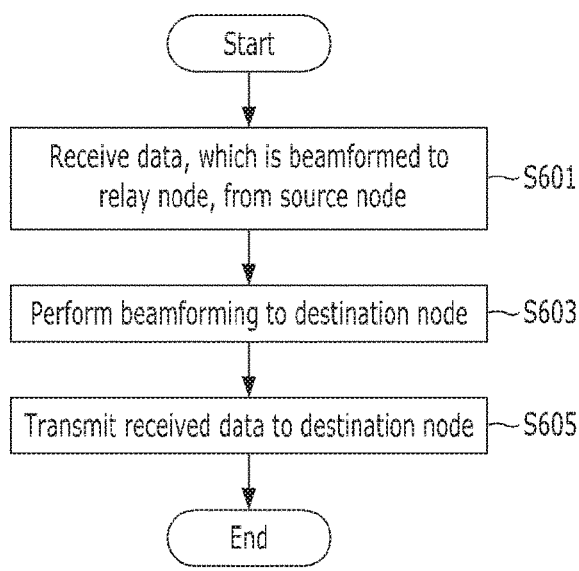
FIG. 6 is a view explaining a data transmission and reception method of a relay node in a cooperative communication system in accordance with an embodiment of the present invention.
Figure 7:
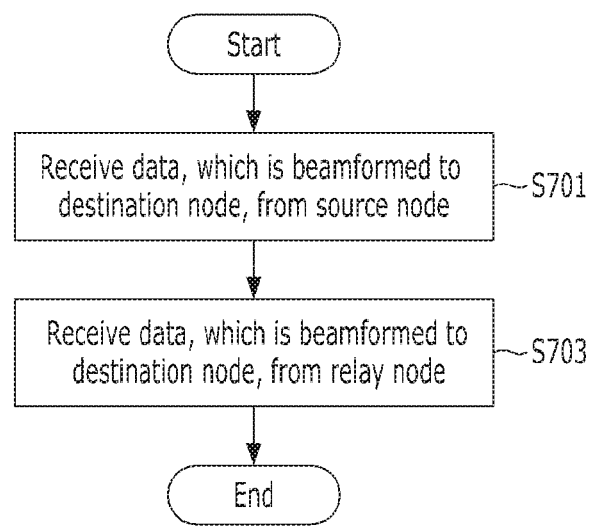
FIG. 7 is a view explaining a data reception method of a destination node in a cooperative communication system in accordance with an embodiment of the present invention.

As described above, the cooperative communication system performs the data transmission and reception by applying a variety of coding and modulation schemes. In the embodiments of the present invention, data is transmitted by using a beamforming, thereby further improving diversity gain and throughput. That is, the source node and the relay node transmit data by performing a beamforming to a target node, and the target node receives data by performing a beamforming to a node which transmits data. Hereinafter, a method for transmitting and receiving data in a cooperative communication system will be described in more detail. FIGS. 5 to 7 are views explaining data transmission and reception methods of a source node, a relay node, and a destination node, respectively.

FIG. 5 is a view explaining a data transmission method of a source node in a cooperative communication system in accordance with an embodiment of the present invention.

As illustrated in FIG. 5, a source node performs a beamforming to a relay node at step S501. At step S503, the source node transmits data to the relay node. At step S505, the relay node performs a beamforming to a destination node. At step S507, the source node transmits data to the destination node. In this case, the source node transmits the same data to the relay node and the destination node.

In order for the beamforming, the source node transmits a training sequence for beamforming to the relay node. The training sequence for beamforming includes index information regarding a plurality of beam directions. The source node receives the index information regarding the direction selected through the training sequence from the relay node. The training sequence may have a preset length (L), and the source node may repetitively transmit the training sequence.

That is, the source node transmits the training sequence with respect to a plurality of beam directions covering all directions or a half direction (0 degree to 180 degrees, or 180 degrees to 360 degrees). The relay node receives the training sequence and takes a correlation in each beam direction. Then, the relay node transmits the index information regarding the beam direction having the greatest correlation value to the source node. The relay node may previously know the information regarding the beam direction pattern of the training sequence.

The source node may perform the beamforming by forming an antenna pattern using the index information so that the beam direction of the antenna is directed to the relay node. Also, the relay node may transmit data by performing the beamforming to the destination node in the above-described manner.

The source node and the relay node may transmit data in the HD scheme or the FD scheme. When the source node and the relay node transmit data in the HD scheme, the source node transmits data to the relay node at the first time slot and transmits data to the destination node at the second time slot. The relay node transmits data received from the source node to the destination node at the second time slot. At this time, the relay node may also transmit data by performing the beamforming to the destination node.

The beamforming may be performed at the first and second time slots. Alternatively, after the beamforming is performed prior to the first and second time slots, the data may be transmitted at the first and second time slots.

FIG. 6 is a view explaining a data transmission and reception method of a relay node in a cooperative communication system in accordance with an embodiment of the present invention.

As illustrated in FIG. 6, a relay node receives data, which is beamformed on the relay node, from a source node at step S601. At step S603, the relay node performs a beamforming to a destination node. At step S605, the relay node transmits the received data to the destination node.

As described above with reference to FIG. 5, the relay node may perform the beamforming by transmitting a training sequence for beamforming to the destination node. Also, the source node and the relay node may transmit data in the HD scheme or the FD scheme. When the source node and the relay node transmit data in the HD scheme, the relay node receives data from the source node at the first time slot and transmits data to the destination node at the second time slot.

Meanwhile, the data received from the source node by the relay node is the same as the data transmitted to the destination node. The relay node may perform a re-processing, such as a decoding and an encoding, on the received data.

The beamforming may be performed at the first and second time slots. Alternatively, after the beamforming is performed prior to the first and second time slots, the data may be transmitted at the first and second time slots.

FIG. 7 is a view explaining a data reception method of a destination node in a cooperative communication system in accordance with an embodiment of the present invention.

As illustrated in FIG. 7, a destination node receives data, which is beamformed on the destination node, from a source node at step S701. At step S703, the destination node receives data, which is beamformed on the destination node, from a relay node. The relay node receives data, which is beamformed on the relay node, from the source node and transmits the received data to the destination node. The data relayed by the relay node is the same as the data transmitted from the source node to the destination node. The relay node may perform a re-processing, such as a decoding, on the relayed data.

As described above with reference to FIGS. 5 and 6, the destination node receives data which is beamformed to the destination node. The destination node receives a training sequence and selects one of a plurality of directions. In this case, the destination node may select one direction by taking a correlation with respect to the training sequence in each beam direction. The destination node transmits the index information regarding the selected direction to the relay node and the source node. The destination node also may receive data by performing the beamforming to the source node and the relay node. That is, the destination node may perform the beamforming by forming the antenna pattern so that the beam direction of the antenna is directed to the relay node.

Furthermore, the source node and the relay node may transmit data in the HD scheme or the FD scheme. When the source node and the relay node transmit data in the HD scheme, the destination node receives data at the same time slot.

The beamforming may be performed at the first and second time slots. Alternatively, after the beamforming is performed prior to the first and second time slots, the data may be transmitted at the first and second time slots.

Meanwhile, one or more of a D-STC, an LMC, a precoding vector switching, and an NC may be additionally applied to the data transmission and reception methods described above with reference to FIGS. 5 to 7. That is, in accordance with the embodiment of the present invention, information signals based on one or more of the D-STC, the LMC, and the precoding vector switching may be generated, and the information signals may be transmitted by performing the beamforming to the relay node and the destination node. Alternatively, the cooperative communication may be achieved by applying at least two schemes of the D-STC, the LMC, the precoding vector switching, and the NC.

Hereinafter, a method for transmitting an information signal including data by using at least one of the D-STC, the LMC, and the precoding vector switching will be described as one embodiment. A case in which a single source node transmits data will be described with reference to FIGS. 8 to 11. A case in which two source nodes transmit data will be described with reference to FIGS. 12 to 17. Meanwhile, although QPSK or 16QAM is described as R-D link quality in FIGS. 8 to 17, the modulation scheme is not limited thereto.

Figure 8:
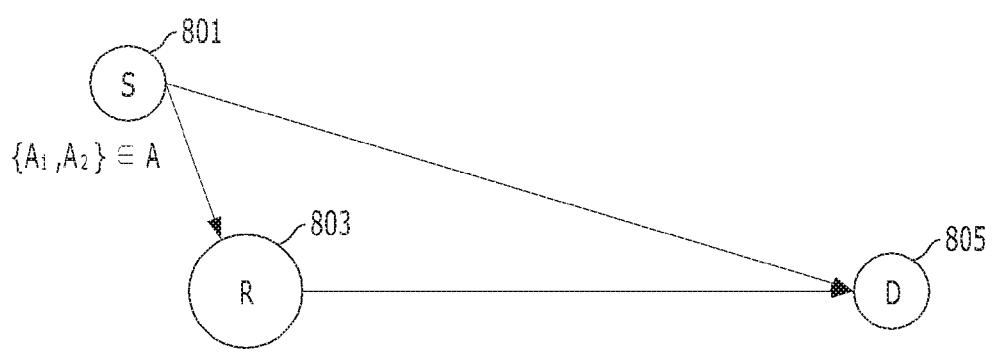
FIG. 8 is a view explaining a cooperative communication method in accordance with a first embodiment of the present invention.

FIG. 8 is a view explaining a cooperative communication method in accordance with a first embodiment of the present invention. Specifically, FIG. 8 illustrates a cooperative communication method to which a D-STC scheme and a precoding vector switching scheme are applied. The cooperative communication method under an environment of Table 1 below will be described as one embodiment.

TABLE 1

A source node and a relay node are allocated the same frequency resource and transmit information.
The relay node can perform transmission/reception but cannot perform simultaneous transmission/reception.
The relay node operates in an HD mode.
A QPSK modulation scheme can be used as R-D link quality.
Each node adopts a single antenna or multiple antennas.
When the multiple antennas are adopted, the same information is transmitted through each antenna.
Information (data) is transmitted using two time slots T1 and T2.

As illustrated in FIG. 8, a source node 801 transmits a QPSK-modulated baseband transmission signal vector A (A ∋ {$A_1, A_2$}) to a relay node 803 at a first time slot T1. $A_1$ and $A_2$ may be an even symbol and an odd symbol among symbols constituting the data A. The relay node 803 estimates or generates the transmission signal vector A by performing a QPSK demapping and a channel decoding on the signal transmitted from the source node 801.

The source node 801 and the relay node 803 transmit the transmission signal vector A to a destination node 805 at a second time slot T2 by applying a Distributed and Precoding-Vector-Switched Space Time Block Coding (DPVS-STBC) or a DPVS Space Frequency Block Coding (DPVS-SFBC) on A. The destination node 805 estimates or acquires the transmission signal vector A by performing a DPVS-STBC or a DPVS-SFBC on the signals received from the source node 801 and the relay node 803.

The DPVS-STBC (or DPVS-SFBC) scheme is a scheme in which a precoding is added to the D-STC described above with reference to FIG. 1. The DPVS-STBC (or DPVS-SFBC) scheme will be described below in more detail.

The source node 801 groups elements of the transmission signal vector A into two groups $A_1$ and $A_2$, and performs a QPSK modulation and precoding on each group by using two subcarriers (or two symbols). The source node 801 transmits the QPSK modulated and precoded signals to the relay node 803. Like the source node 801, the relay node 803 also transmits the transmission signal vector A to the destination node 805.

The precoding is performed as expressed in Equation 1. $w_1$ and $w_2$ denote precoding vectors with respect to the first element and the second element within each group, respectively.

$$[w_1^T \ w_2^T] \begin{bmatrix} A_1 & -A_2^* \\ A_2 & A_1^* \end{bmatrix} = \begin{bmatrix} w_{0,1} & w_{0,2} \\ w_{1,1} & w_{1,2} \end{bmatrix} \begin{bmatrix} A_1 & -A_2^* \\ A_2 & A_1^* \end{bmatrix} \quad \text{Eq. 1}$$

$$= \begin{bmatrix} w_{0,1}A_1 + w_{0,2}A_2 & -w_{0,1}A_2^* + w_{0,2}A_1^* \\ w_{1,1}A_1 + w_{1,2}A_2 & -w_{1,1}A_2^* + w_{1,2}A_1^* \end{bmatrix} \begin{matrix} S \\ R \end{matrix}$$

Symbol 1    Symbol 2
(or Subcarrier 1   Subcarrier 2)

Using the signals transmitted by the source node 801 and the relay node 803, Equation 1 will be described. The source node 801 precodes $A_1$ and $A_2$, and transmits the precoded signals $w_{0,1}A_1+w_{0,2}A_2$ and $-w_{0,1}A_2^*+w_{0,2}A_1^*$ to the destination node 805. The relay node 803 also precodes $A_1$ and $A_2$, and transmits the precoded signals $w_{1,1}A_1+w_{1,2}A_2$ and $-w_{1,1}A_2^*+w_{1,2}A_1^*$ to the destination 805. The precoding vectors $w_1$ and $w_2$ may be vectors whose independency is maximally guaranteed, and may be used continuously used, regardless of transmission time.

Meanwhile, in order to maximally guarantee the independent channel characteristic between the groups, a precoding vector switching scheme may be applied. As a first embodiment using the precoding vector switching scheme, the precoding vectors $w_1=[w_{0,1} \ w_{1,1}]=[1 \ 1]$ and $w_2=[w_{0,2} \ w_{1,2}]=[1 \ -1]$ may be applied to the even symbol group $A_1$, and the precoding vectors $w_1=[1 \ -1]$ and $w_2=[1 \ 1]$ may be applied to the odd symbol group $A_2$. The opposite precoding vectors may be applied to the even symbol group $A_1$ and the odd symbol group $A_2$.

As a second embodiment using the precoding vector switching scheme, precoding vectors $w_1$ and $w_2$ expressed as Equation 2 below may be applied to an index K indicating the group. N is a value less than or equal to the number of time slots for data transmission and greater than or equal to 1, and $\Delta$ is a value less than or equal to N and greater than or equal to 0.

$$w_1 = \begin{bmatrix} 1 & e^{\pm j\frac{2\pi k \Delta}{N}} \end{bmatrix}, \quad w_2 = \begin{bmatrix} 1 & e^{\pm j\left(\frac{2\pi k \Delta}{N}+\pi\right)} \end{bmatrix}. \quad \text{Eq. 2}$$

The generalized equation for the precoding vectors $w_1$ and $w_2$, including the first and second embodiments, may be expressed as Equation 3 below. X(k) and y(k) are arbitrary real numbers at which the independency between the two precoding vectors $w_1$ and $w_2$ is maximally guaranteed.

$$w_1[1 e^{j2\pi x(k)}], w_2=[1 e^{j2\pi y(k)}]. \quad \text{Eq. 3}$$

Meanwhile, as described above, a beamforming technology may be used together with the D-STC scheme and the precoding vector switching scheme. Also, in Equation 1, a case in which the precoding vectors $w_1$ and $w_2$ are $w_1=[1 \ 0]$, $w_2=[0 \ 1]$ and are modified into $-A_2 \rightarrow A_2, A_2 \rightarrow A_1, A_1^* \rightarrow A_2$ represents a case in which the beamforming technology is used without precoding.

Figure 9:
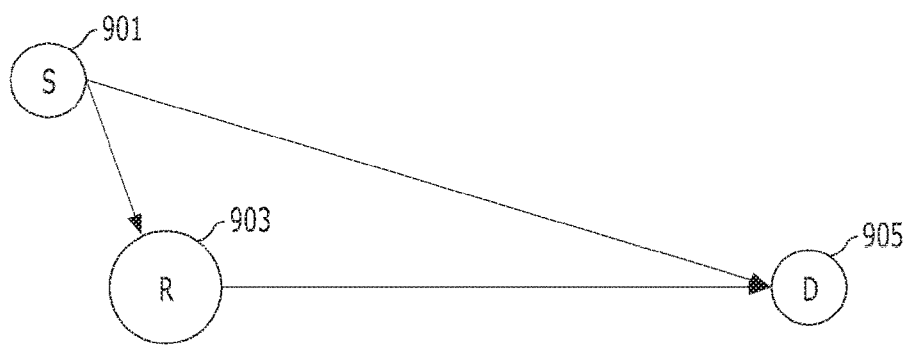
FIG. 9 is a view explaining a cooperative communication method in accordance with a second embodiment of the present invention.

FIG. 9 is a view explaining a cooperative communication method in accordance with a second embodiment of the present invention. Specifically, FIG. 9 illustrates a cooperative communication method to which a D-STC scheme and a precoding vector switching scheme are applied. The cooperative communication method under an environment of Table 1 below will be described as one embodiment.

A source node 901 transmits an LMCed baseband transmission signal vector A to a relay node 903 and a destination node 905 at a first time slot T1. The LMCed baseband transmission signal vector A may be expressed as Equation 4 below. $A_b$ is a transmission signal vector of a base layer, and $A_s$ is a transmission signal vector of an enhancement layer. As described above with reference to FIG. 3, $\alpha$ and $\beta$ are power of $A_b$ and $A_s$, respectively.

$$A=\alpha A_b+\beta A_s. \quad \text{Eq. 4}$$

The relay node 903 estimates or generates binary information signal vectors $a_b$ and $a_s$ with respect to $A_b$ and $A_s$ by performing a layered demapping and a channel decoding on the signals transmitted at the first time slot T1. The relay node 903 generates $A_s$ from $a_s$. The destination node 905 generates $A_b$ by performing a layered demapping and a channel decoding on the signals transmitted at the first time slot T1.

The source node 901 transmits $A_s$ to the destination node 905 at a second time slot T2, and the relay node 903 also transmits $A_s$ to the destination node 905 at the second time slot T2. The destination node 905 generates $A_s$ by performing a layered demapping and a channel decoding.

At this time, the source node 901, the relay node 903, and the destination node 905 may perform an encoding and a decoding by additionally applying the precoding vector switching scheme described above with reference to FIG. 8. Also, as described above, a beamforming technology may be used together with the LMC scheme and the precoding vector switching scheme as described above.

Figure 10:
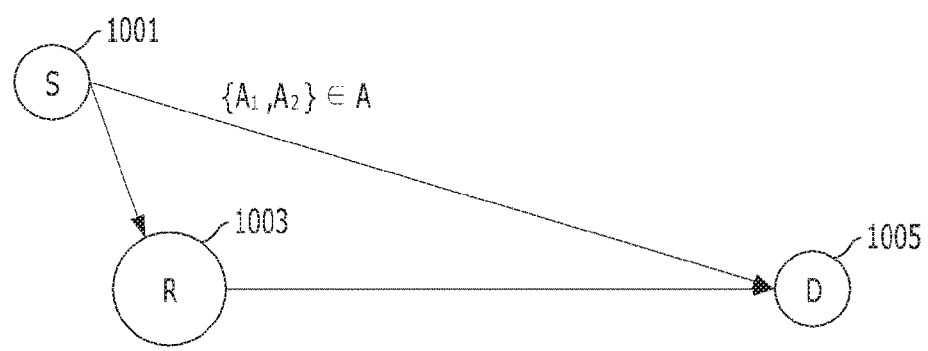
FIG. 10 is a view explaining a cooperative communication method in accordance with a third embodiment of the present invention.

FIG. 10 is a view explaining a cooperative communication method in accordance with a third embodiment of the present invention. Specifically, FIG. 10 illustrates a cooperative communication method to which a D-STC scheme and a precoding vector switching scheme are applied. The cooperative communication method under an environment of Table 2 below will be described as one embodiment.

TABLE 2

A source node and a relay node are allocated different frequency resources and transmit information.
The relay node can perform transmission/reception and can perform simultaneous transmission/reception.
The relay node operates in an FD mode.
A QPSK modulation scheme can be used as R-D link quality.
Each node adopts a single antenna or multiple antennas.
When the multiple antennas are adopted, the same information is transmitted through each antenna.

The cooperative communication method of FIG. 10 is different from the cooperative communication method of FIG. 8 in that data is transmitted using two frequency resources. Meanwhile, the cooperative communication method of FIG. 10 is identical to the cooperative communication method of FIG. 9 in that the D-STC scheme and the precoding vector switching method are applied.

As illustrated in FIG. 10, a source node 1001 transmits a QPSK-modulated baseband transmission signal vector $A$ ($A \ni \{A_1, A_2\}$) to a relay node 1003 and a destination node 1105 at a first frequency resource f1. At this time, the source node 801 precodes $A_1$ and $A_2$ as expressed in Equation 1, and transmits the precoded signals $w_{0,1}A_1+w_{0,2}A_2$ and $-w_{0,1}A_2^*+w_{0,2}A_1^*$. The relay node 1003 estimates or generates A by performing a decoding based on a DPVS-STBC or a DPVS-SFBC.

The relay node 1003 precodes $A_1$ and $A_2$ as expressed in Equation 1, and transmits the precoded signals $w_{1,1}A_1+w_{1,2}A_2$ and $-w_{1,1}A_2^*+w_{1,2}A_1^*$ to the destination node 1005 at a second frequency resource f2.

The destination node 1005 receives the precoded signals transmitted through the first and second frequency resources f1 and f2, and estimates or generates A by performing a decoding based on a DPVS-STBC or a DPVS-SFBC.

Meanwhile, as described above, a beamforming technology may be used together with the D-STC scheme and the precoding vector switching scheme. That is, the source node 1001 may perform a beamforming to transmit data to the relay node 1003 and the destination node 1005 at the first frequency resource f1, and the relay node 1003 may transmit data to the destination node 1005 at the second frequency resource f2.

Figure 11:
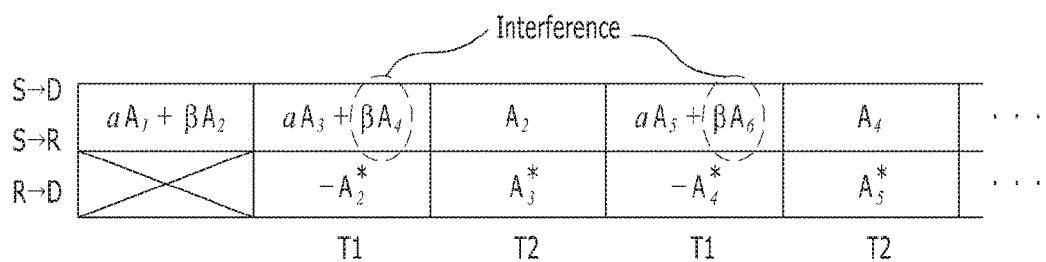
FIG. 11 is a view explaining a cooperative communication method in accordance with a fourth embodiment of the present invention.

FIG. 11 is a view explaining a cooperative communication method in accordance with a fourth embodiment of the present invention. Specifically, FIG. 11 illustrates a cooperative communication method to which a D-STC scheme and an LMC scheme are applied. The cooperative communication method under an environment of Table 3 below will be described as one embodiment.

TABLE 3

A source node and a relay node are allocated the same frequency resource and transmit information.
The relay node can perform transmission/reception and can perform simultaneous transmission/reception.
The relay node operates in an FD mode.
A QPSK modulation scheme can be used as R-D link quality.
Each node adopts a single antenna or multiple antennas.
When the multiple antennas are adopted, the same information is transmitted through each antenna.
Information is transmitted using two time slots T1 and T2.

As illustrated in FIG. 11, a source node S transmits an LMCed baseband transmission signal vector $\alpha A_1+\beta A_2$ to a relay node R and a destination node D upon initial data transmission. The relay node R estimates or generates $A_1$ and $A_2$ through a layered demapping and a channel decoding. $\alpha$ and $\beta$ are identical to those defined in FIG. 3. In subscripts of A, an odd number represents a transmission signal vector of a base layer, and an even number represents a transmission signal vector of an enhancement layer. $A_n$ represents each element constituting data which is transmitted by the source node S.

Then, the source node S transmits the LMCed baseband transmission signal vector $\alpha A_3+\beta A_4$ to the relay node R and the destination node D at a first time slot T1. The relay node R generates $-A_2^*$ by using $A_1$ and $A_2$, and transmits $-A_2^*$ to the destination node D. Also, the relay node R estimates $A_3$ and $A_4$ by performing a layered demapping and a channel decoding on $\alpha A_3+\beta A_4$.

Next, the source node S transmits $A_2$ to the relay node R and the destination node D at a second time slot T2. The relay node R generates $A_3^*$ by using $A_3$ and $A_4$, and transmits $A_3^*$ to the destination node D.

Again, the source node S transmits an LMCed baseband transmission signal vector $\alpha A_5+\beta A_6$ to the relay node R and the destination node D at the first time slot T1. The relay node R generates $-A_4^*$ by using $A_3$ and $A_4$, and transmits $-A_4^*$ to the destination node D. Also, the relay node R estimates $A_5$ and $A_6$ by performing a layered demapping and a channel decoding on $\alpha A_5+\beta A_6$.

Again, the source node S transmits $A_4$ to the relay node R and the destination node D at the second time slot T2. The relay node R generates $A_5^*$ by using $A_5$ and $A_6$, and transmits $A_5^*$ to the destination node D.

Data is transmitted to the destination node D by repeating the above procedures performed at the first and second time slots T1 and T2. Consequently, the destination node D receives the D-STCed signal. Therefore, the destination node D may generate necessary information by performing a decoding and a channel decoding according to the D-STC.

Meanwhile, as described above, a beamforming technology may be used together with the D-STC scheme and the LMC scheme.

Figure 12:
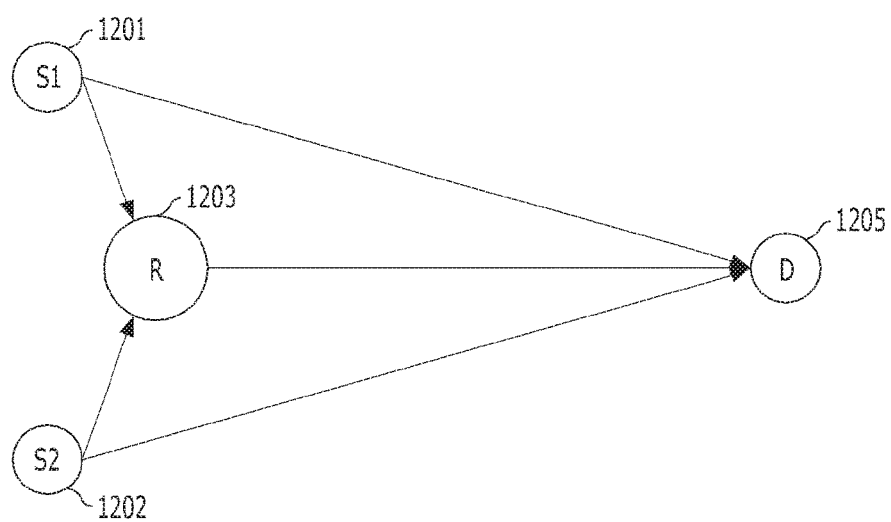
FIG. 12 is a view explaining a cooperative communication method in accordance with a fifth embodiment of the present invention.

FIG. 12 is a view explaining a cooperative communication method in accordance with a fifth embodiment of the present invention. Specifically, FIG. 12 illustrates a cooperative communication method to which an NC scheme and an LMC scheme are applied. The cooperative communication method under an environment of Table 4 below will be described as one embodiment.

TABLE 4

First and second source nodes S1 and S2 are allocated different frequency resources f1 and f2 and transmit information.
A relay node R can perform transmission/reception but cannot perform simultaneous transmission/reception.
The relay node R transmits information by using one of the frequency resources allocated to the first and second source nodes.
The relay node R operates in an HD mode.
A QPSK modulation scheme can be used as R-D link quality.
Each node adopts a single antenna or multiple antennas.
When the multiple antennas are adopted, the same information is transmitted through each antenna.
Information (data) is transmitted using two time slots T1 and T2.

As illustrated in FIG. 12, a first source node 1201 transmits an LMCed baseband information signal vector $\alpha A_b + \beta A_s$ to a relay node 1203 and a destination node 1205 at a first time slot T1 by using a first frequency resource f1. A second source node 1202 transmits an LMCed baseband information signal vector $\alpha B_b + \beta B_s$ to the relay node 1203 and the destination node 1205 at the first time slot T1 by using a second frequency resource f2.

The relay node 1203 estimates $a_s$ and $b_s$ by performing a layered demapping and a channel decoding on the data signals transmitted from the first and second source nodes 1201 and 1202. The destination node 1205 estimates $a_b$, $b_b$, $a_s$ and $b_s$ by performing a layered demapping and a channel decoding on the data signals transmitted from the first and second source nodes 1201 and 1202. $a_b$, $b_b$, $a_s$ and $b_s$ represent binary information vectors of $A_b$, $B_b$, $A_s$ and $B_s$.

The relay node 1203 performs an XOR operation on $a_s$ and $b_s$, and transmits the modulated signal vectors of the operation information C(=$a_s \oplus b_s$) to the destination node 1205 at the second time slot T2. The destination node 1205 estimates the operation information C by using the signal vectors transmitted from the relay node 1203. The destination node 1205 finally generates $a_b$, $b_b$, $a_s$ and $b_s$ by using the previously estimated $a_b$, $b_b$, $a_s$ and $b_s$.

Meanwhile, as described above, a beamforming technology may be used together with the NC scheme and the LMC scheme. That is, the first source node 1201, the second source node 1202, and the relay node 1203 transmit the signals based on the NC and the LMC by performing a beamforming to a target node. The beamforming technology may also be used in the methods described below with reference to FIGS. 13 to 17.

Figure 13:
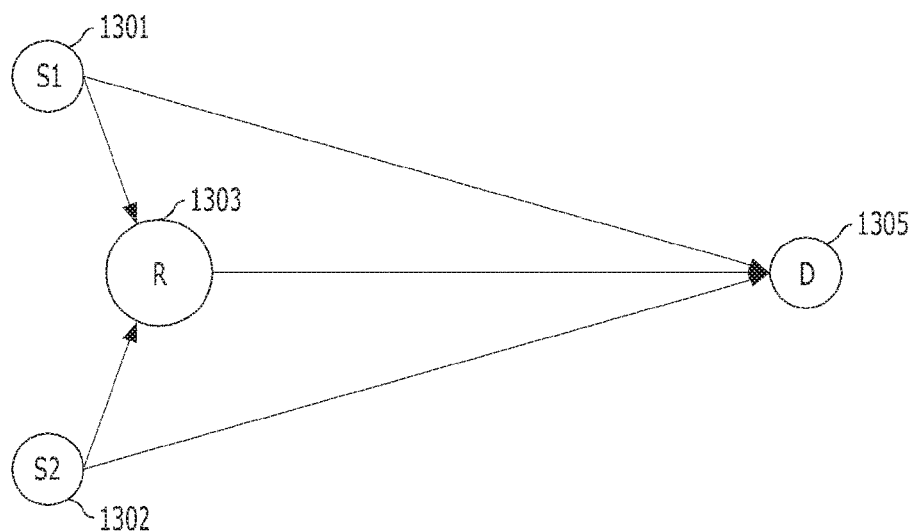
FIG. 13 is a view explaining a cooperative communication method in accordance with a sixth embodiment of the present invention.

FIG. 13 is a view explaining a cooperative communication method in accordance with a sixth embodiment of the present invention. Specifically, FIG. 13 illustrates a cooperative communication method to which an LMC scheme is applied. The cooperative communication method under an environment of Table 4 will be described as one embodiment. However, instead of the QPSK modulation scheme, a 16QAM modulation scheme is applied in the embodiment of FIG. 13.

As illustrated in FIG. 13, a first source node 1301 transmits an LMCed baseband information signal vector $\alpha A_b + \beta A_s$ to a relay node 1303 and a destination node 1305 at a first time slot T1 by using a first frequency resource f1. A second source node 1302 transmits an LMCed baseband information signal vector $\alpha B_b + \beta B_s$ to the relay node 1303 and the destination node 1305 at the first time slot T1 by using a second frequency resource f2. The relay node 1303 estimates $a_s$ and $b_s$ by performing a layered demapping and a channel decoding on the data signals transmitted from the first and second source nodes 1301 and 1302.

The relay node 1303 generates a signal $a_s b_s$ (or $b_s a_s$) by performing a "serially concatenated binary combination" on the estimated $a_s$ and $b_s$. The relay node 1303 modulates the signal $a_s b_s$ (or $b_s a_s$), and transmits the modulated signal vector to the destination node 1305 at a second time slot T2.

The destination node 1305 estimates $a_s$ and $b_s$ from the modulated signal vector of the relay node 1303. The destination node 1305 eliminates components corresponding to $A_s$ and $B_s$ from the signal received at the first and second time slots T1 and T2 by using the estimated $a_s$ and $b_s$. Therefore, the destination node 1305 may acquire $a_b$ and $b_b$ through a QPSK demapping and a channel decoding. Consequently, the destination node 1305 may acquire $a_s$, $b_s$, $a_b$ and $b_b$.

Meanwhile, as described above, a beamforming technology may be used together with the LMC scheme.

Figure 14:
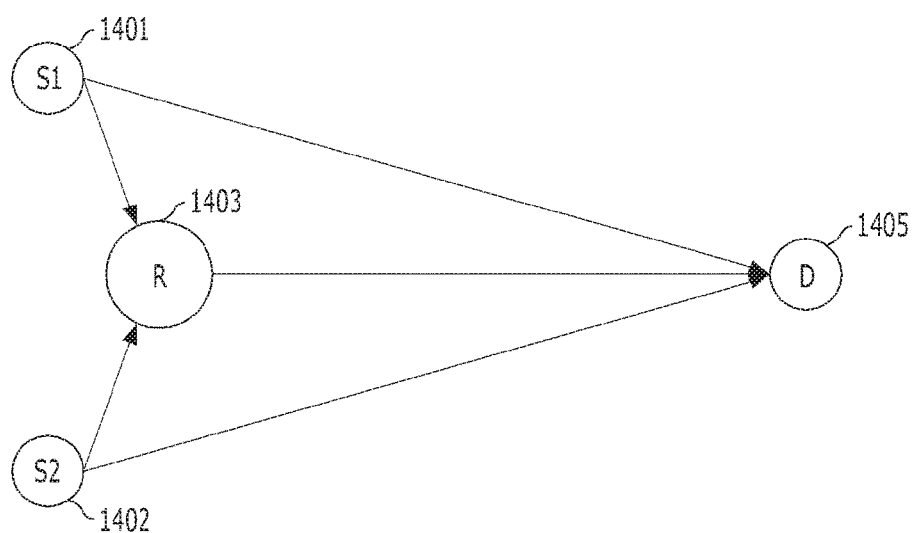
FIG. 14 is a view explaining a cooperative communication method in accordance with a seventh embodiment of the present invention.

FIG. 14 is a view explaining a cooperative communication method in accordance with a seventh embodiment of the present invention. Specifically, FIG. 14 illustrates a cooperative communication method to which an NC scheme and an LMC scheme are applied. The cooperative communication method under an environment of Table 5 below will be described as one embodiment.

TABLE 5

First and second source nodes S1 and S2 are allocated different frequency resources f1 and f2 and transmit information.
A relay node R can perform transmission/reception and can perform simultaneous transmission/reception.
The relay node R transmits information by using a frequency resource f3 different from the frequency resources f1 and f2 allocated to the first and second source nodes.
The relay node R operates in an FD mode.
A QPSK modulation scheme can be used as R-D link quality.
Each node adopts a single antenna or multiple antennas.
When the multiple antennas are adopted, the same information is transmitted through each antenna.

As illustrated in FIG. 14, a first source node 1401 transmits an LMCed baseband information signal vector $\alpha A_b + \beta A_s$ to a relay node 1403 and a destination node 1405 by using a first frequency resource f1. A second source node 1402 transmits an LMCed baseband information signal vector $\alpha B_b + \beta B_s$ to the relay node 1403 and the destination node 1405 by using a second frequency resource f2.

The relay node 1403 estimates $a_s$ and $b_s$ by performing a layered demapping and a channel decoding on the data signals transmitted from the first and second source nodes 1401 and 1402. The destination node 1405 estimates $a_b$, $b_b$, $a_s$ and $b_s$ by performing a layered demapping and a channel decoding on the data signals transmitted from the first and second source nodes 1401 and 1402.

The relay node 1403 performs an XOR operation on $a_s$ and $b_s$, and transmits the modulated signal vectors of the operation information C ($a_s \oplus b_s$) to the destination node 1405 by using a third frequency resource f3. The destination node 1405 estimates the operation information C by using the signal vectors transmitted from the relay node 1403. The destination node 1405 finally generates $a_b$, $b_b$, $a_s$ and $b_s$ by using the previously estimated $a_b$, $b_b$, $a_s$ and $b_s$.

Meanwhile, as described above, a beamforming technology may be used together with the NC scheme and the LMC scheme.

Figure 15:
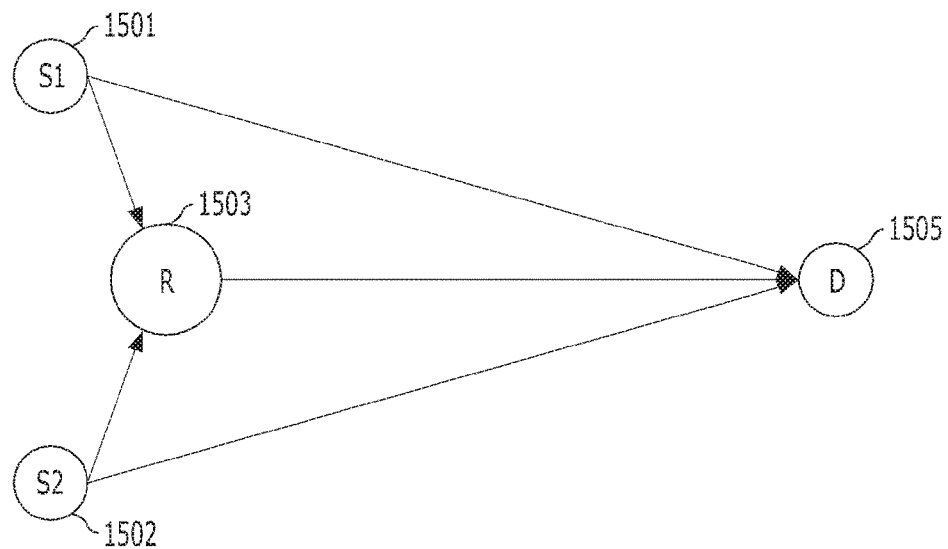
FIG. 15 is a view explaining a cooperative communication method in accordance with an eighth embodiment of the present invention.

FIG. 15 is a view explaining a cooperative communication method in accordance with an eighth embodiment of the present invention. Specifically, FIG. 15 illustrates a cooperative communication method to which an LMC scheme is applied. The cooperative communication method under an environment of Table 5 will be described as one embodiment. However, instead of the QPSK modulation scheme, a 16QAM modulation scheme is applied in the embodiment of FIG. 15.

As illustrated in FIG. 15, a first source node 1501 transmits an LMCed baseband information signal vector $\alpha A_b + \beta A_s$ to a relay node 1503 and a destination node 1505 by using a first frequency resource f1. A second source node 1502 transmits an LMCed baseband information signal vector $\alpha B_b + \beta B_s$ to the relay node 1503 and the destination node 1505 by using a second frequency resource f2. The relay node 1503 estimates $a_s$ and $b_s$ by performing a layered demapping and a channel decoding on the data signals transmitted from the first and second source nodes 1501 and 1502.

The relay node 1503 generates a signal $a_s b_s$ (or $b_s a_s$) by performing a "serially concatenated binary combination" on the estimated $a_s$ and $b_s$. The relay node 1503 modulates the signal $a_s b_s$ (or $b_s a_s$), and transmits the modulated signal vector to the destination node 1505 by using a third frequency resource f3.

The destination node 1505 estimates $a_s$ and $b_s$ from the modulated signal vector of the relay node 1503. The destination node 1505 eliminates components corresponding to $A_s$ and $B_s$ from the signal received through the first and second frequency resources f1 and f2 by using the estimated $a_s$ and $b_s$. Therefore, the destination node 1505 may acquire $a_b$ and $b_b$ through a QPSK demapping and a channel decoding. Consequently, the destination node 1505 may acquire $a_s$, $b_s$, $a_b$ and $b_b$.

Meanwhile, as described above, a beamforming technology may be used together with the LMC scheme.

Figure 16:
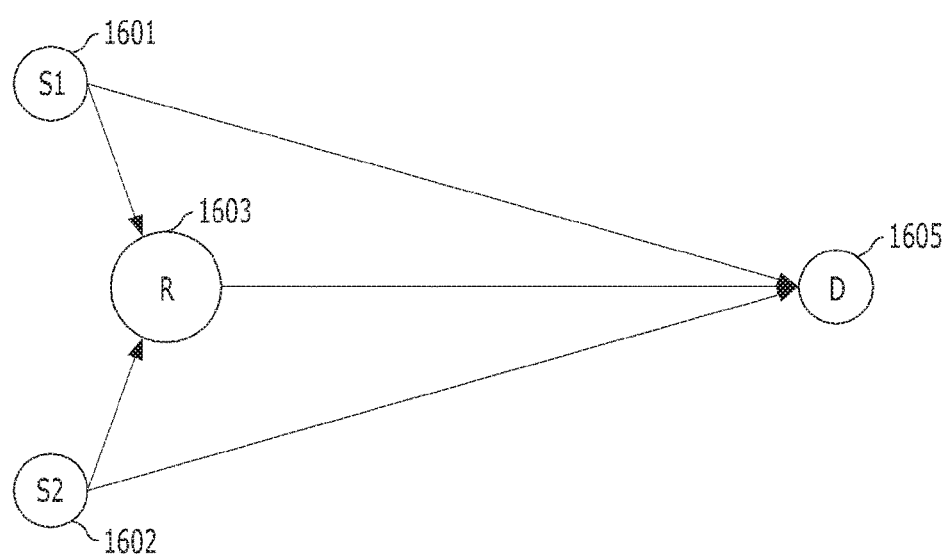
FIG. 16 is a view explaining a cooperative communication method in accordance with a ninth embodiment of the present invention.

FIG. 16 is a view explaining a cooperative communication method in accordance with a ninth embodiment of the present invention. Specifically, FIG. 16 illustrates a cooperative communication method to which an NC scheme and an LMC scheme are applied. The cooperative communication method under an environment of Table 6 below will be described as one embodiment.

TABLE 6

First and second source nodes S1 and S2 and a relay node R are allocated the same frequency resource and transmit information.
The relay node R can perform transmission/reception but cannot perform simultaneous transmission/reception.
The relay node R operates in an HD mode.
A QPSK modulation scheme can be used as R-D link quality.
Each node adopts a single antenna or multiple antennas.
When the multiple antennas are adopted, the same information is transmitted through each antenna.
Information is transmitted using three time slots T1, T2 and T3.

As illustrated in FIG. 16, a first source node 1601 transmits an LMCed baseband information signal vector $\alpha A_b + \beta A_s$ to a relay node 1603 and a destination node 1605 at a first time slot T1. A second source node 1602 transmits an LMCed baseband information signal vector $\alpha B_b + \beta B_s$ to the relay node 1603 and the destination node 1605 at the first time slot T2.

The relay node 1603 estimates $a_s$ and $b_s$ by performing a layered demapping and a channel decoding on the data signals transmitted from the first and second source nodes 1601 and 1602. The destination node 1605 estimates $a_b$, $b_b$, $a_s$ and $b_s$ by performing a layered demapping and a channel decoding on the data signals transmitted from the first and second source nodes 1601 and 1602.

The relay node 1603 performs an XOR operation on $a_s$ and $b_s$, and transmits the modulated signal vectors of the operation information $C(=a_s \oplus b_s)$ to the destination node 1605 at a third time slot T3. The destination node 1605 estimates the operation information C by using the signal vectors transmitted from the relay node 1603. The destination node 1605 finally generates $a_b$, $b_b$, $a_s$ and $b_s$ by using the previously estimated $a_b$, $b_b$, $a_s$ and $b_s$.

Meanwhile, as described above, a beamforming technology may be used together with the NC scheme and the LMC scheme.

Figure 17:
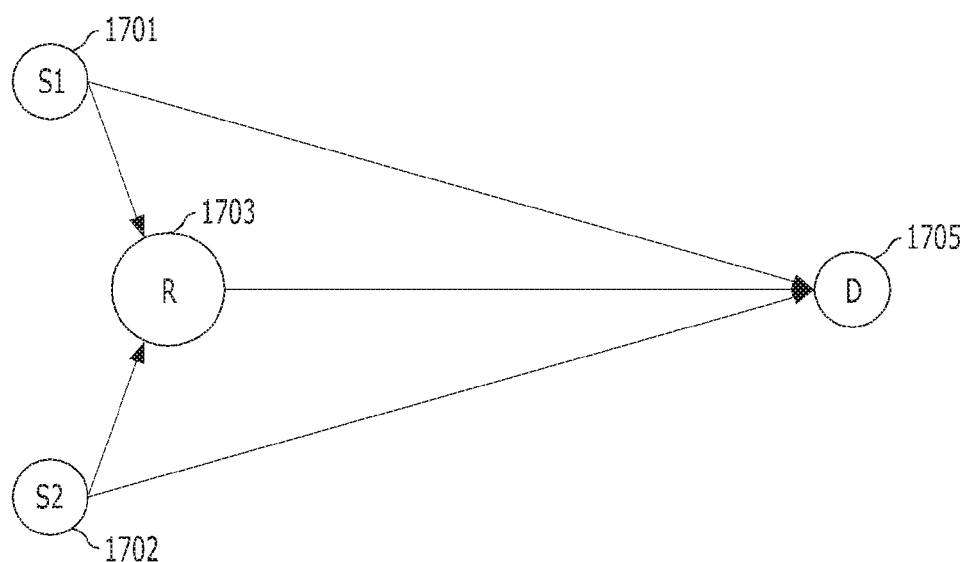
FIG. 17 is a view explaining a cooperative communication method in accordance with a tenth embodiment of the present invention.

FIG. 17 is a view explaining a cooperative communication method in accordance with a tenth embodiment of the present invention. Specifically, FIG. 17 illustrates a cooperative communication method to which an LMC scheme is applied. The cooperative communication method under an environment of Table 6 will be described as one embodiment. However, instead of the QPSK modulation scheme, a 16QAM modulation scheme is applied in the embodiment of FIG. 17.

As illustrated in FIG. 17, a first source node 1701 transmits an LMCed baseband information signal vector $\alpha A_b + \beta A_s$ to a relay node 1703 and a destination node 1705 at a first time slot T1. A second source node 1702 transmits an LMCed baseband information signal vector $\alpha B_b + \beta B_s$ to the relay node 1703 and the destination node 1705 at a second time slot T2. The relay node 1703 estimates $a_s$ and $b_s$ by performing a layered demapping and a channel decoding on the data signals transmitted from the first and second source nodes 1701 and 1702.

The relay node 1703 generates a signal $a_s b_s$ (or $b_s a_s$) by performing a "serially concatenated binary combination" on the estimated $a_s$ and $b_s$. The relay node 1703 modulates the signal $a_s b_s$ (or $b_s a_s$), and transmits the modulated signal vector to the destination node 1705 at a third time slot T3.

The destination node 1705 estimates $a_s$ and $b_s$ from the modulated signal vector of the relay node 1703. The destination node 1705 eliminates components corresponding to $A_s$ and $B_s$ from the signal received at the first and second time slots T1 and T2 by using the estimated $a_s$ and $b_s$. Therefore, the destination node 1705 may acquire $a_b$ and $b_b$ through a QPSK demapping and a channel decoding. Consequently, the destination node 1705 may acquire $a_s$, $b_s$, $a_b$ and $b_b$.

Meanwhile, as described above, a beamforming technology may be used together with the LMC scheme. Although a case in which one destination node is provided has been described with reference to FIGS. 5 to 17, the data transmission and reception methods and the cooperative communication methods in accordance with the embodiments of the present invention can also be applied to a plurality of destination nodes.

In accordance with the exemplary embodiments of the present invention, the data is transmitted by performing the beamforming to the target node, thereby further improving the diversity gain and throughput of the cooperative communication system.

Furthermore, the data encoded according to one or more of the LMC scheme, the NC scheme, the D-STC scheme, and the precoding vector switching scheme is transmitted by performing the beamforming to the target node, thereby further improving the diversity gain and throughput of the cooperative communication system.

Although the embodiments of the present invention have been described in view of processes, the respective steps of the data transmission and reception methods in the cooperative communication system and the cooperative communication methods in accordance with the embodiments of the present invention can be easily understood in view of apparatuses. Therefore, the steps included in the data transmission and reception methods in the cooperative communication system and the cooperative communication methods in accordance with the embodiments of the present invention may be understood as the elements which are included in the data transmission and reception apparatus of the cooperative communication system and the cooperative communication apparatus according to the principle of the present invention.

Specifically, the source node of the cooperative communication system in accordance with the embodiment of the present invention includes: a first beamforming unit configured to perform a beamforming to a relay node; a first transmission unit configured to transmit data to the relay node; a second beamforming unit configured to perform a beamforming to a destination node; and a second transmission unit configured to transmit data to the destination node.

Also, the relay node of the cooperative communication system includes: a reception unit configured to receive data, which is beamformed to the relay node, from a source node; a beamforming unit configured to perform a beamforming to a destination node; and a transmission unit configured to transmit the received data to the destination node.

In addition, the destination node of the cooperative communication system includes: a first reception unit configured to receive data, which is beamformed to the destination node, from a source node; and a second reception unit configured to receive the data which is beamformed to the destination node, from a relay node, wherein the relay node receives data, which is beamformed to the relay node, from the source node and transmits the received data to the destination node.

Furthermore, the cooperative communication apparatus includes: a generation unit configured to generate an information signal according to one or more of a Distributed Space Time Coding (D-STC) scheme, a Layered Modulation and Coding (LMC) scheme, and a precoding vector switching scheme; and a transmission unit configured to transmit the information signal by performing a beamforming to a relay node and a destination node.

The data transmission and reception methods and the cooperative communication methods in accordance with the embodiments of the present invention can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A data transmission method of a source node, comprising:
   transmitting a data to a relay node in a first time slot;
   transmitting the data to a destination node in a second time slot after the first time slot;
   wherein the relay node transmits the data to the destination node in the second time slot,
   wherein the data includes first symbols and second symbols,
   wherein the first symbols and the second symbols are allocated in other frequency resource at a same time slot, and
   wherein the first symbols are derived by applying a complex conjugation to the second symbols, or the second symbols are derived by applying a complex conjugation to the first symbols.

2. The data transmission method of claim 1, wherein the relay node transmits the data to the destination node in the second time slot, based on FD (Full Duplex) or HD (Half Duplex).

3. The data transmission method of claim 1, wherein the source node modulates the data using QPSK or 16 QAM.

4. The data transmission method of claim 1, wherein the first symbols are odd symbols and the second symbols are even symbols.

5. The data transmission method of claim 1, wherein the first symbols are even symbols and the second symbols are odd symbols.

6. The data transmission method of claim 1, wherein the relay node performs beamforming by transmitting a training sequence to the destination node, and transmits the data to the destination node after completion of beamforming.

7. A data transmission method of a relay node, comprising:
   receiving a data from a source node in a first time slot;
   transmitting the data to a destination node in a second time slot after the first time slot;
   wherein the relay node transmits the data to the destination node in the second time slot,
   wherein the data includes first symbols and second symbols,
   wherein the first symbols and the second symbols are allocated in other frequency resource at a same time slot, and
   wherein the first symbols are derived by applying a complex conjugation to the second symbols, or the second symbols are derived by applying a complex conjugation to the first symbols.

8. The data transmission method of claim 7, wherein the source node modulates the data using QPSK or 16 QAM, and transmits the modulated data to the relay node in the first time slot.

9. The data transmission method of claim 7, wherein the first symbols are odd symbols and the second symbols are even symbols.

10. The data transmission method of claim 7, wherein the first symbols are even symbols and the second symbols are odd symbols.

11. The data transmission method of claim 7, wherein the relay node performs beamforming by transmitting a training sequence to the destination node, and transmits the data to the destination node after completion of beamforming.

12. A data transmission method of a destination node, comprising:
   receiving a data from a source node in a second time slot;
   receiving a data from a relay node in a second time slot;

wherein the source node transmits the data to the relay node in a first time slot before the second time slot;

wherein the data includes first symbols and second symbols, wherein the first symbols and the second symbols are allocated in other frequency resource at a same time slot, and wherein the first symbols are derived by applying a complex conjugation to the second symbols, or the second symbols are derived by applying a complex conjugation to the first symbols.

13. The data transmission method of claim 12, wherein the relay node transmits the data to the destination node in the second time slot, based on FD (Full Duplex) or HD (Half Duplex).

14. The data transmission method of claim 12, wherein the source node modulates the data using QPSK or 16 QAM, and transmits the modulated data to the relay node in the first time slot.

15. The data transmission method of claim 12, wherein the first symbols are odd symbols and the second symbols are even symbols.

16. The data transmission method of claim 12, wherein the first symbols are even symbols and the second symbols are odd symbols.

17. The data transmission method of claim 12, wherein the relay node performs beamforming by transmitting a training sequence to the destination node, and transmits the data to the destination node after completion of beamforming.

* * * * *